March 1, 1938.    F. RAMSTEDT    2,109,624
GROUND COFFEE HOLDER
Filed March 11, 1935

Inventor
Frederick Ramstedt
By J. Kaplan
Attorney

Patented Mar. 1, 1938

2,109,624

UNITED STATES PATENT OFFICE 2,109,624

GROUND COFFEE HOLDER

Frederick Ramstedt, New York, N. Y., assignor to General Paper Products Corp., Boston, Mass., a corporation of Massachusetts Application March 11, 1935, Serial No. 10,509

3 Claims. (Cl. 53—3)

This invention relates to coffee pots of the percolator type and has special reference to a ground coffee holder for such coffee pots.

In percolator coffee pots there is provided a vertical tube having a steam collecting base so that water is carried up through the tube and, striking against a dome at the top of the pot, drops down through a perforated receptacle adapted to hold ground coffee. This receptacle is usually removable from the tube for cleansing. However, the wet coffee grounds tend to cling to the sides and bottom of such receptacles so that they are very difficult to clean. Moreover, it is customary with housewives to pour the water used in cleansing such a receptacle down the drain of the ordinary kitchen sink with the result that the insoluble coffee grounds tend to collect in the drain and clog the latter.

One object of the present invention is to provide an improved ground coffee receptacle for coffee pots of such cheap construction that it may be destroyed after one using.

A second important object of the invention is to provide a paper coffee receptacle for such pots which, with its contents, may be removed after one use and thrown away, the removal of the receptacle leaving the pot itself free from grounds.

A third important object of the invention is to provide a paper lining for the usual metallic ground coffee receptacle common to said pots.

A fourth important object of the invention is to provide a paper ground coffee receptacle having ears which may overlie the edge of the metal receptacle and which may serve as means to support the edge of the paper and also as means to enable the receptacle to be lifted.

With the above and other objects in view, the invention consists in general of certain novel details of construction and combinations of parts hereinafter fully described, illustrated in the accompanying drawing and specifically claimed.

In the accompanying drawing, like characters of reference indicate like parts in the several views, and:—

Figure 1:
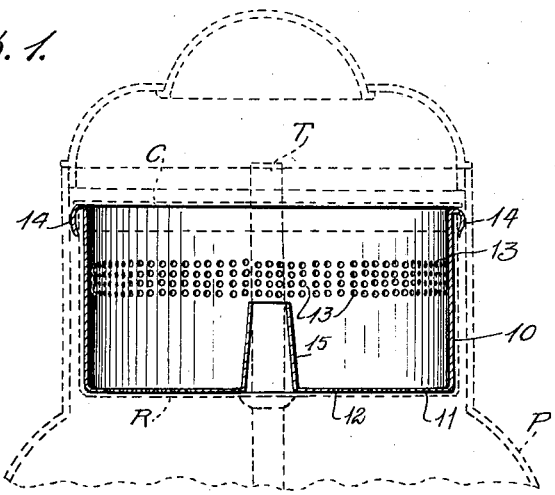
Figure 1 is a diametric section through the invention showing the same in position in a coffee percolator, the latter being shown in dotted lines.

In order that the utility of the invention may be clearly understood there has been shown in Figure 1 the upper part of a coffee pot P with the percolator parts in position, T being the usual upflow tube, R the perforated receptacle for ground coffee and C the perforated cover for the latter.

The invention itself is preferably made of paper like material insoluble in hot water and impervious to such hot water. Also, the material used is to be sufficiently tough and tear resistant that it may be handled when containing the coffee grounds without danger of these grounds breaking through.

Figure 2:
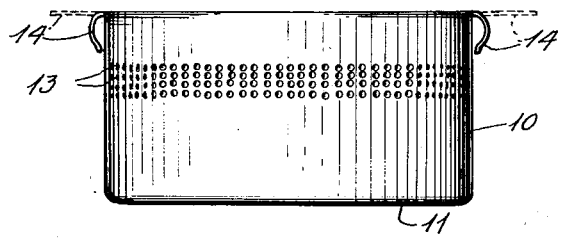
Figure 2 is a side elevation of the device removed from the pot.
Figure 3:
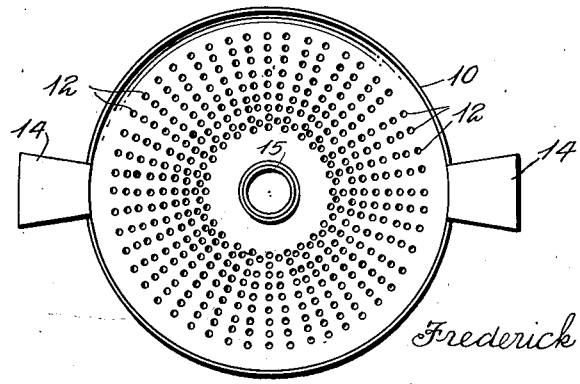
Figure 3 is a plan view thereof.

As here shown the device has a cylindrical side wall 10 and is closed at its lower end by a bottom 11 provided with a multiplicity of perforations 12. Also a band of perforations 13 extends around the side wall about two-thirds up from the bottom. These perforations are sufficiently small to keep the ground coffee, whether in a wet or dry state, from passing therethrough. At opposite points of the rim of this receptacle there is provided a pair of tabs 14 curved downwardly to extend over the rim of the receptacle R and down along its side wall. Obviously, being of thin paper like material these tabs 14 may, when desired, be bent to extend upwardly as shown in dotted lines in Figure 2. Preferably the entire paper receptacle is formed of a single piece of material formed to shape in the manner commonly used in forming paper cups and the like. However, the device may be made of separate pieces suitably held together as by a waterproof and tasteless cement, glue or the like.

In order to prevent escape of grounds at the opening necessary for passage of the central tube of the receptacle R there is provided, centrally of the paper receptacle, a tube 15 of proper size to fit closely on the central tube of the metal receptacle.

In constructing the device provision is made for the passage of the coffee liquid through the perforations 12 and 13 and this may be done in any suitable manner as by making the device slightly smaller than the metal receptacle or by providing a special metal receptacle having large perforations so said metal receptacle acts merely as a basket to support the paper receptacle.

In use, the paper receptacle is placed in the metal receptacle and the desired amount of ground coffee is then placed in the paper receptacle after which the cover C is put on the receptacle R. The remainder of the operation of making drinkable coffee is then carried out in the well known manner. When it is desired to remove the paper receptacle and used grounds the percolator parts are removed from the pot. The cover C is removed and the tabs 14 bent up and grasped. The paper receptacle and its contents are then lifted out of the metal receptacle leaving the latter free from adhering grounds so that the washing of the pot and its parts can be accomplished without danger of getting coffee grounds in the wash water. The paper receptacle, being cheap, is to be thrown away after one use and thus does not require washing.

There has thus been provided a simple and economical device of the kind described and for the purpose specified.

It is obvious that changes may be made in the form and construction of the invention without departing from its material principles. It is not, therefore, desired to confine the invention to the exact form herein shown and described but it is desired to include all such forms as come within the scope of the appended claims.

What is claimed is:—

1. A percolator including a coffee basket and a liner therefor, said receptacle made of paper-like material having a perforated bottom and a perforated side wall, said liner having tabs projecting from its upper edge to form holding and lifting means, said tabs being flexible to fold downwardly between the side wall of the ground coffee receptacle and the wall of the percolator.

2. The combination with the perforated coffee-grounds holder of a coffee-maker of a one-piece paper liner covering the walls and bottom of said holder, the bottom of said liner containing fine openings punched therethrough through which coffee extract may freely pass, said liner being of a non-filtering character but being removable in intact condition together with a charge of extracted coffee grounds from said holder.

3. The combination with the perforated coffee-grounds holder of a coffee percolator equipped with a circulating spout projecting upwardly of the holder bottom of a paper liner covering the walls and bottom of said holder, the bottom of said liner containing fine openings punched therethrough through which coffee extract may freely pass and having a central opening through which said circulating spout projects, said liner being of a non-filtering character but being removable in intact condition together with a charge of extracted coffee grounds from said holder.

FREDERICK RAMSTEDT.